US009880672B2

(12) United States Patent
Ugawa

(10) Patent No.: US 9,880,672 B2
(45) Date of Patent: Jan. 30, 2018

(54) DISPLAY APPARATUS, DISPLAY METHOD, AND COMPUTER-READABLE RECORDING MEDIUM

(75) Inventor: Akira Ugawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 672 days.

(21) Appl. No.: 13/188,531

(22) Filed: Jul. 22, 2011

(65) Prior Publication Data

US 2012/0019527 A1   Jan. 26, 2012

(30) Foreign Application Priority Data

Jul. 26, 2010   (JP) ................................. 2010-167474

(51) Int. Cl.
| | |
|---|---|
| *G06T 15/00* | (2011.01) |
| *H04N 13/00* | (2006.01) |
| *G06K 7/08* | (2006.01) |
| *G06F 3/044* | (2006.01) |

(Continued)

(52) U.S. Cl.
CPC ......... *G06F 3/044* (2013.01); *H04N 13/0022* (2013.01); *H04N 13/0239* (2013.01); *H04N 13/0409* (2013.01); *G06F 2203/04101* (2013.01)

(58) Field of Classification Search
CPC ........... G06F 2203/04808; G06F 3/017; G06F 3/0416; G06F 2203/0331; G06F 2203/0333; G06F 2203/04105; G06F 2203/04106; G06F 2203/04107; G06F 3/044; G06F 3/0412; G06F 2203/04101; G06F 2203/04103; G06F 3/0414; G06F 3/04883
See application file for complete search history.

(56) References Cited

U.S. PATENT DOCUMENTS

| | | | | |
|---|---|---|---|---|
| 6,552,718 | B2 * | 4/2003 | Ahn et al. | ...................... 345/173 |
| 6,573,155 | B2 * | 6/2003 | Ahn et al. | ...................... 438/455 |
| 7,066,599 | B2 * | 6/2006 | Hattori et al. | ..................... 353/7 |

(Continued)

FOREIGN PATENT DOCUMENTS

| | | |
|---|---|---|
| JP | 2004-280496 A | 10/2004 |
| JP | 2009-116769 A | 5/2009 |

(Continued)

OTHER PUBLICATIONS

Office Action issued in corresponding Japanese Patent Application No. 2010-167474 dated Jan. 7, 2014. (English translation provided).

(Continued)

*Primary Examiner* — Mohammed Rahaman
*Assistant Examiner* — Kehinde O Abimbola
(74) *Attorney, Agent, or Firm* — Volpe and Koenig, P.C.

(57) ABSTRACT

A display apparatus includes a display unit that displays a 3D image thereon, the 3D image being created by combining two pieces of image data in which adjacent right-side and left-side parts of respective fields of view overlap with each other; a touch panel that is provided on the display screen of the display unit and that detects a touch position of an external object or a nearby position of an object near a surface of the touch panel; and a sensitivity setting unit that sets, in accordance with the level to which the 3D image appears to protrude in a direction perpendicular to the display screen, the detection sensitivity of the touch panel.

13 Claims, 13 Drawing Sheets

(51) Int. Cl.
*H04N 13/02* (2006.01)
*H04N 13/04* (2006.01)

(56) References Cited

U.S. PATENT DOCUMENTS

| | | | |
|---|---|---|---|
| 7,102,686 B1* | 9/2006 | Orimoto | G03B 35/08 348/231.7 |
| 7,898,578 B2* | 3/2011 | Nakamura | 348/231.3 |
| 8,411,045 B2* | 4/2013 | Futter | 345/173 |
| 8,531,431 B2* | 9/2013 | Swedin | G02F 1/13338 178/18.05 |
| 8,564,550 B2* | 10/2013 | Hashimoto | 345/173 |
| 8,624,853 B2* | 1/2014 | Han et al. | 345/173 |
| 8,737,721 B2* | 5/2014 | Arcas et al. | 382/154 |
| 9,310,984 B2* | 4/2016 | Kim | G06F 3/04815 |
| 2002/0018589 A1* | 2/2002 | Beuker et al. | 382/132 |
| 2002/0090798 A1* | 7/2002 | Ahn et al. | 438/455 |
| 2004/0070673 A1* | 4/2004 | Nakamura | 348/207.2 |
| 2004/0257531 A1* | 12/2004 | Hattori et al. | 353/10 |
| 2006/0268159 A1* | 11/2006 | Orimoto | G03B 35/08 348/373 |
| 2007/0139391 A1* | 6/2007 | Bischoff | 345/173 |
| 2007/0262953 A1* | 11/2007 | Zackschewski | 345/156 |
| 2008/0316182 A1* | 12/2008 | Antila et al. | 345/173 |
| 2009/0015703 A1* | 1/2009 | Kim | G03B 29/00 348/333.12 |
| 2009/0179893 A1* | 7/2009 | Nakamura | 345/419 |
| 2009/0213242 A1* | 8/2009 | Rofougaran et al. | 348/222.1 |
| 2009/0279784 A1* | 11/2009 | Arcas et al. | 382/190 |
| 2009/0293119 A1* | 11/2009 | Jonsson | 726/19 |
| 2010/0020160 A1* | 1/2010 | Ashbey | 348/43 |
| 2010/0033443 A1* | 2/2010 | Hashimoto | 345/173 |
| 2010/0115455 A1* | 5/2010 | Kim | G06F 3/04815 715/781 |
| 2010/0149126 A1* | 6/2010 | Futter | 345/174 |
| 2010/0302185 A1* | 12/2010 | Han et al. | 345/173 |
| 2011/0292042 A1* | 12/2011 | Vaganov | B44D 2/002 345/419 |
| 2012/0013569 A1* | 1/2012 | Swedin | G02F 1/13338 345/174 |
| 2012/0120021 A1* | 5/2012 | Konishi et al. | 345/174 |
| 2014/0043292 A1* | 2/2014 | Hashimoto | 345/174 |
| 2014/0292749 A1* | 10/2014 | Vaganov | B44D 2/002 345/419 |

FOREIGN PATENT DOCUMENTS

| | | |
|---|---|---|
| JP | 2010-108203 | 5/2010 |
| JP | 2011-013778 A | 1/2011 |

OTHER PUBLICATIONS

Notice of Rejection mailed in corresponding Japanese Patent Application No. 2010-167474 dated Sep. 30, 2014, consisting of 3 pp. (English Translation Provided).

* cited by examiner

DISPLAY APPARATUS, DISPLAY METHOD, AND COMPUTER-READABLE RECORDING MEDIUM

CROSS-REFERENCE TO RELATED APPLICATIONS

This application is based upon and claims the benefit of priority from Japanese Patent Application No. 2010-167474, filed on Jul. 26, 2010, the entire contents of which are incorporated herein by reference.

BACKGROUND OF THE INVENTION

1. Field of the Invention

The present invention relates to a display apparatus that displays a three-dimensional image by using two pieces of image data in which adjacent right-side and left-side parts of respective fields of view overlap with each other, a display method thereof, and a computer-readable recording medium.

2. Description of the Related Art

A well-known display apparatus takes images of the same object by using a plurality of digital cameras that are installed at different positions, thereby acquiring a plurality of pieces of image data, and then displays, by using the parallax of the object included in the acquired image data, a three-dimensional image that appears to be stereoscopic to the eyes of the user (hereinafter, "3D image").

A well-known technology used in such a display apparatus enables, when a user manipulates a touch panel provided on the screen of a display monitor, switching the image displayed on the display monitor between a 3D image and a two-dimensional image (hereinafter, 2D image) (see, for example, Japanese Laid-open Patent Publication No. 2010-108203). According to the above technology, an image that is on an area including a position where the user touches the touch panel is switched on the display monitor to a 2D image or a 3D image.

SUMMARY OF THE INVENTION

A display apparatus according to as aspect of the present invention includes a display unit that displays a 3D image thereon, the 3D image being created by combining two pieces of image data in which adjacent right-side and left-side parts of respective fields of view overlap with each other; a touch panel that is provided on a display screen of the display unit and that detects a touch position of an external object or a nearby position of an object near a surface of the touch panel; and a sensitivity setting unit that sets, in accordance with a level to which the 3D image appears to protrude in a direction perpendicular to the display screen, a detection sensitivity of the touch panel.

A display method according to another aspect of the present invention is performed by a display apparatus that can display a 3D-image and includes a touch panel provided on a display screen of a display unit. The method includes displaying a 3D image that is created by combining two pieces of image data in which adjacent right-side and left-side parts of respective fields of view overlap with each other; detecting a touch position of an external object or a nearby position of an object near a surface of the touch panel; and setting, when the nearby position of the object is detected, a detection sensitivity of the touch panel in accordance with a level to which the 3D image appears to protrude in a direction perpendicular to the display screen.

A non-transitory computer-readable storage medium according to still another aspect of the present invention has an executable program stored thereon. The program instructs a processor included in a display apparatus that includes a touch panel provided on a display screen of a display unit, to perform: displaying a 3D image that is created by combining two pieces of image data in which adjacent right-side and left-side parts of respective fields of view overlap with each other; detecting a touch position of an external object or a nearby position of an object near a surface of the touch panel; and setting, when the nearby position of the object is detected, a detection sensitivity of the touch panel in accordance with a level to which the 3D image appears to protrude in a direction perpendicular to the display screen.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
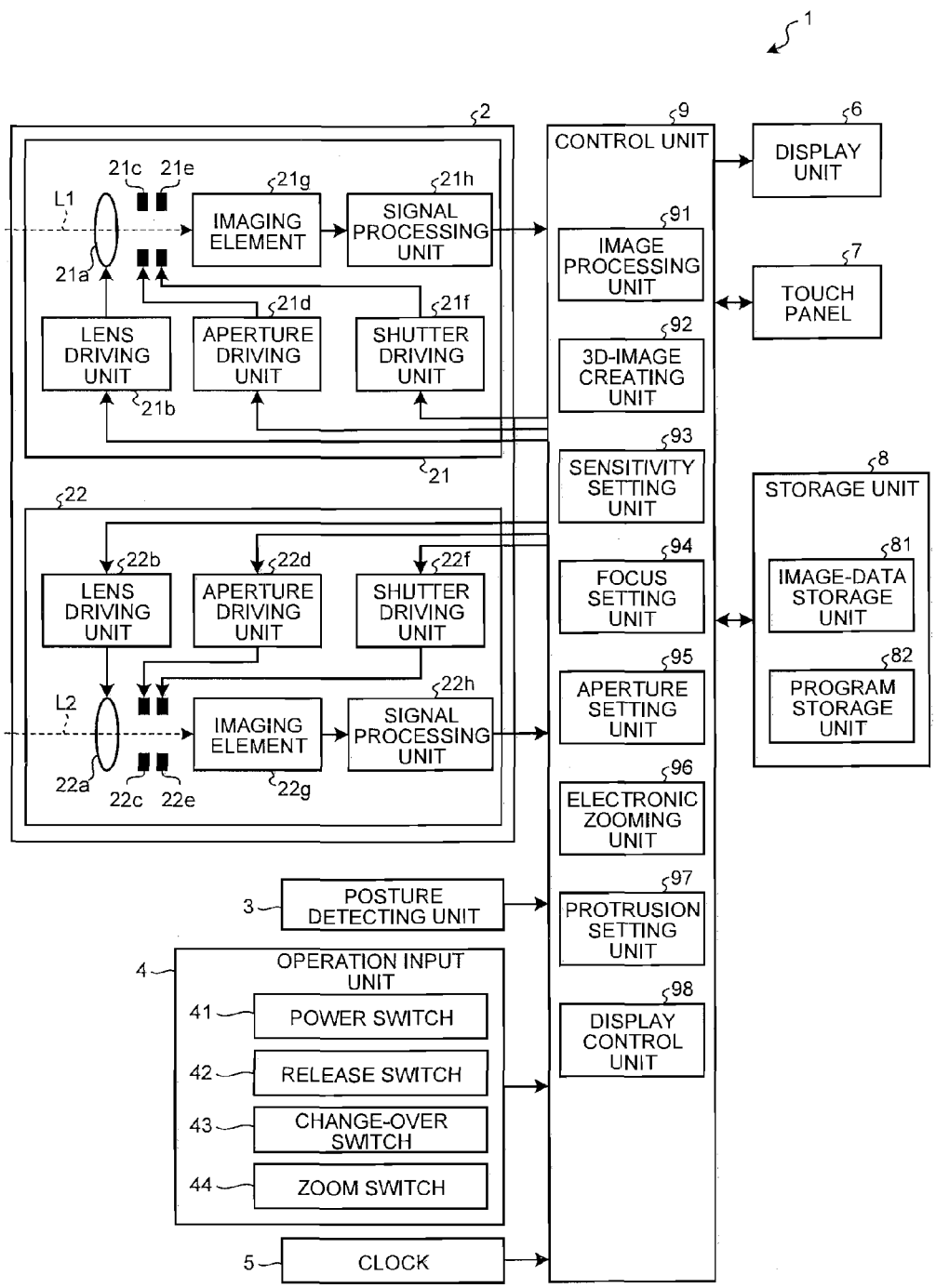
FIG. 1 is a block diagram of the configuration of a display apparatus according to an embodiment of the present invention.

FIG. 1 is a block diagram of the configuration of a display apparatus according to an embodiment of the present invention. In the present embodiment, a digital stereo camera with a display apparatus mounted thereon is used as an example. As illustrated in FIG. 1, a display apparatus 1 includes an imaging unit 2 that takes two images from different positions and creates two pieces of image data in which adjacent right-side and left-side parts of respective fields of view overlap with each other; a posture detecting unit 3 that detects the posture of the display apparatus 1; an operation input unit 4 that receives various information about the display apparatus 1; a clock 5 that has a shooting date-and-time determining function and a timer function; a display unit 6 that displays thereon a 3D image or a 2D image; a touch panel 7 that receives a signal in accordance with a touch position where an external object touches the touch panel 7; a storage unit 8 that stores therein various information that includes image data created by the imaging unit 2; and a control unit 9 that controls operations of the display apparatus 1.

The imaging unit 2 includes a first imaging unit 21 and a second imaging unit 22. The first imaging unit 21 and the second imaging unit 22 are arranged side by side so that respective optical axes L1 and L2 are parallel to each other or make a predetermined angle.

The first imaging unit 21 includes a lens unit 21a, a lens driving unit 21b, an aperture 21c, an aperture driving unit 21d, a shutter 21e, a shutter driving unit 21f, an imaging element 21g, and a signal processing unit 21h.

The lens unit 21a includes a focus lens, a zoom lens, etc. The lens unit 21a condenses light coming from a predetermined fields of view area. The lens driving unit 21b includes a DC motor, etc. The lens driving unit 21b moves a focus lens, a zoom lens, etc., of the lens unit 21a along the optical axis L1 to change the point of focus and the focal length of the lens unit 21a.

The aperture 21c adjusts an amount of light condensed by the lens unit 21a incoming to adjust an exposure. The aperture driving unit 21d includes a stepping motor, etc. The aperture driving unit 21d drives the aperture 21c.

The shutter 21e switches the state of the imaging element 21g to be exposed or shielded. The shutter driving unit 21f includes a stepping motor, etc. The shutter driving unit 21f drives the shutter 21e in accordance with a release signal.

The imaging element 21g includes a charge coupled device (CCD) that receives light condensed by the lens unit 21a and converts the light into an electric signal (analog signal), a complementary metal oxide semiconductor (CMOS), etc. The imaging element 21g outputs the generated electric signal to the signal processing unit 21h.

The signal processing unit 21h processes the electric signal received from the imaging element 21g, for example, amplifies the electric signal, then converts the processed signal to digital image data by using A/D conversion, and then outputs the digital image data to the control unit 9.

The second imaging unit 22 has the same configuration as the configuration of the first imaging unit 21. The second imaging unit 22 includes a lens unit 22a, a lens driving unit 22b, an aperture 22c, an aperture driving unit 22d, a shutter 22e, a shutter driving unit 22f, an imaging element 22g, and a signal processing unit 22h.

The posture detecting unit 3 includes an acceleration sensor. The posture detecting unit 3 detects the acceleration of the display apparatus 1, thereby detecting the posture of the display apparatus 1. More particularly, the posture detecting unit 3 detects the posture of the display apparatus 1 with reference to a horizontal plane.

The operation input unit 4 includes a power switch 41 that switches the display apparatus 1 to be powered on or powered off; a release switch 42 that inputs a release signal to issue an instruction to take a still image; a change-over switch 43 that switches various shooting modes and various settings of the display apparatus 1; and a zoom switch 44 that is used for zoom operation of the imaging unit 2.

The clock 5 generates a time signal that is a reference signal of the operations of the display apparatus 1. By using the time signal, the control unit 9 sets an image-data acquiring time, exposure times of the imaging elements 21g and 22g, etc.

Figure 2:
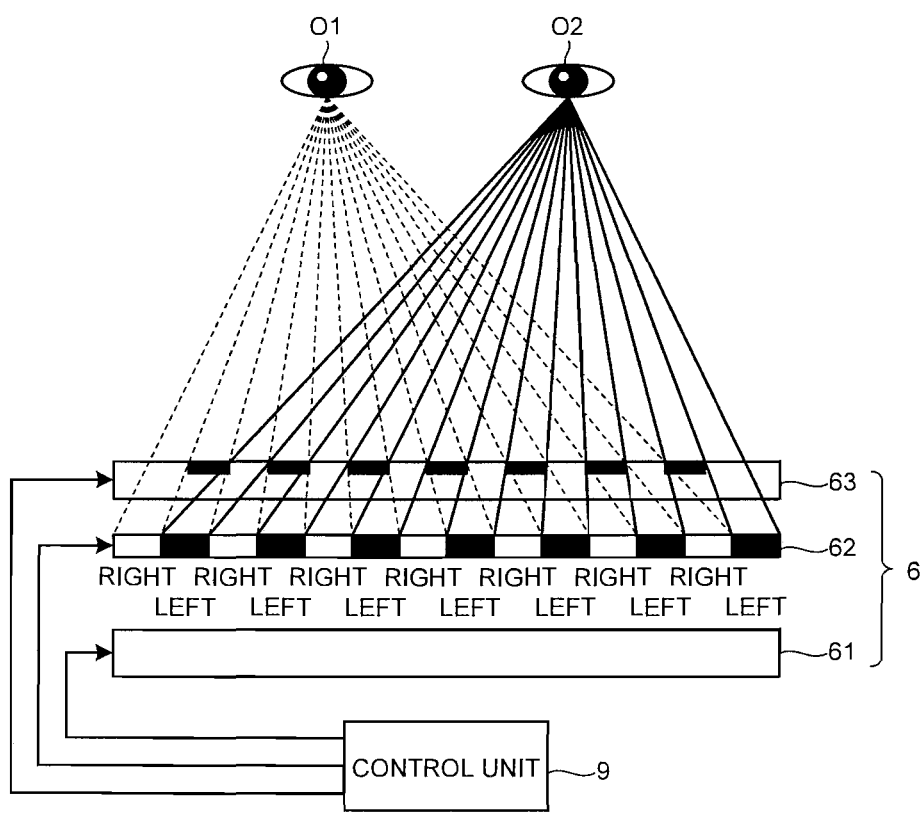
FIG. 2 is a schematic diagram of the configuration of a display unit included in the display apparatus according to the embodiment of the present invention.

FIG. 2 is a schematic diagram of the configuration of the display unit 6. As illustrated in FIG. 2, the display unit 6 includes a backlight 61, a display panel 62, and a parallax barrier 63. The backlight 61 includes a light emitting diode (LED), etc. The backlight 61 emits light from behind to display an image. The display panel 62 includes a display panel made of a liquid crystal or an electro luminescence. The parallax barrier 63 is made of a liquid crystal, etc. The parallax barrier 63 is a layer formed on the top surface of the display panel 62. The parallax barrier 63 has slits aligned at intervals narrower than the intervals of pixels of the display panel. The parallax barrier 63 splits an image into an image for a user's right eye O1 and an image for a user's left eye O2. The parallax barrier 63 in the present embodiment uses a parallax barrier technology.

When the display unit 6 having the above configuration receives 3D image data from the control unit 9, under the control of the control unit 9, slits of a right-eye image and slits of a left-eye image are arranged, alternately, on the display panel 62, sequentially from the left-sided pixel in the horizontal direction and the parallax barrier 63 splits light output from each pixel of the display panel 62. With this configuration, the right-eye image is caught only by the right eye O1 and the left-eye image is caught only by the left eye O2. Therefore, the user sees the 3D image displayed on the display unit 6 in a stereoscopic vision. When the display unit 6 is switched from the 3D image mode to the 2D image mode, a voltage applied to the parallax barrier 63 is switched from on to off and the slits of the parallax barrier 63 are switched from a shielded mode to a permeable mode, which makes the 2D image visible.

Figure 3A:
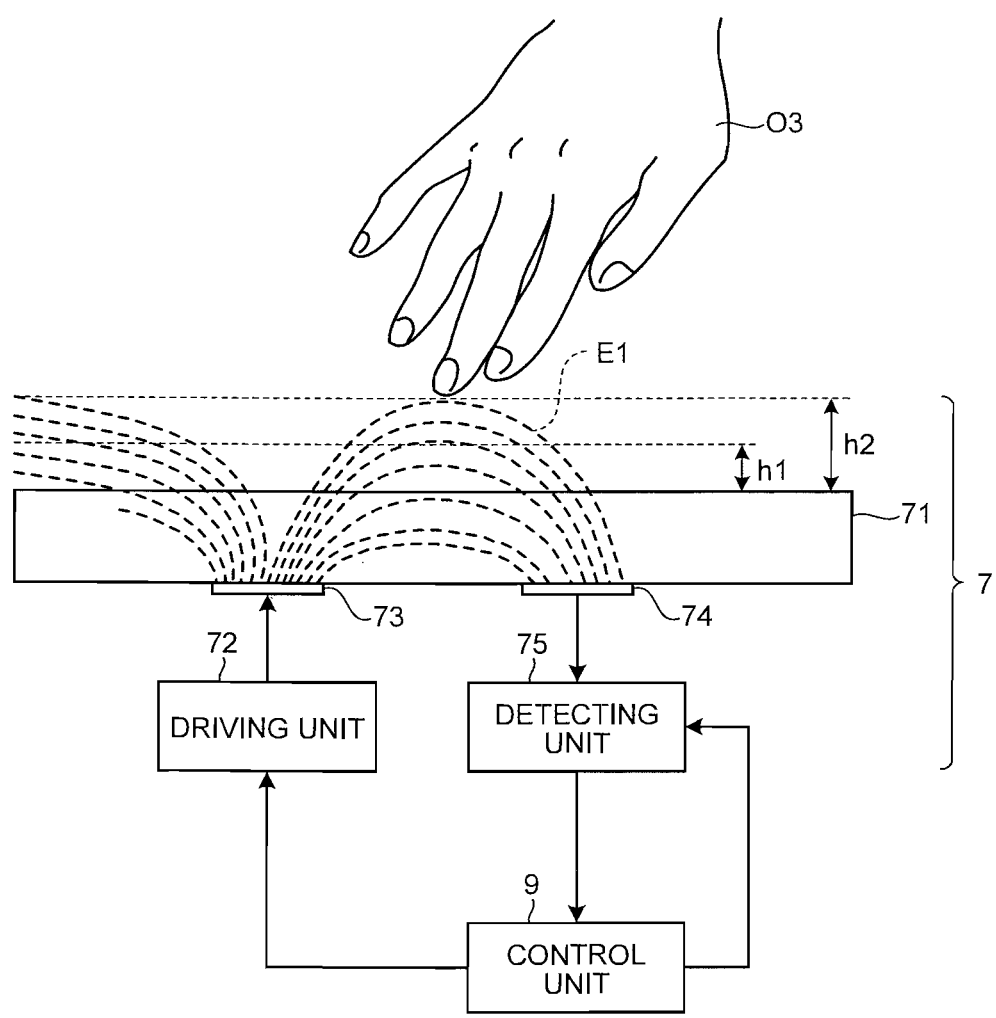
FIG. 3A is a schematic diagram of the configuration of a touch panel included in the display apparatus according to the embodiment of the present invention.

FIG. 3A is a schematic diagram of the configuration of the touch panel 7. As illustrated in FIG. 3A, the touch panel 7 includes a front panel 71, a driving unit 72, a driving electrode 73, a receiving electrode 74, and a detecting unit 75.

The front panel 71 is a panel having a predetermined thickness and shaped rectangular, viewed from the top. The front panel 71 is made of glass or polyethylene terephthalate (PET).

The driving unit 72 outputs a driving pulse (the applied voltage being, for example, 5V) to the driving electrode 73, thereby generating a capacitance between the driving electrode 73 and the receiving electrode 74. The driving electrode 73 and the receiving electrode 74 are indium tin oxide (ITO) electrodes. The driving electrode 73 and the receiving electrode 74 are aligned alternately on the lower surface of the front panel 71 at 5 mm-intervals.

Figure 3B:
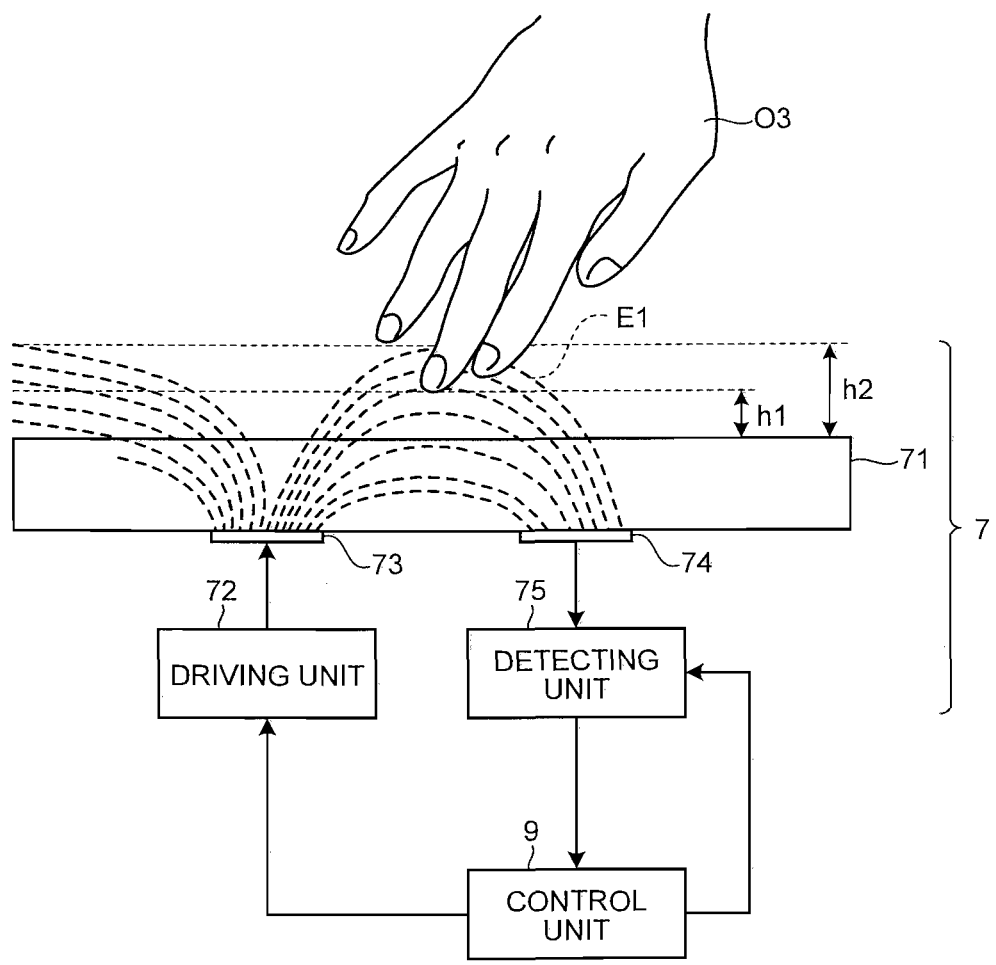
FIG. 3B is a schematic diagram of the configuration of the touch panel included in the display apparatus according to the embodiment of the present invention.
Figure 3C:
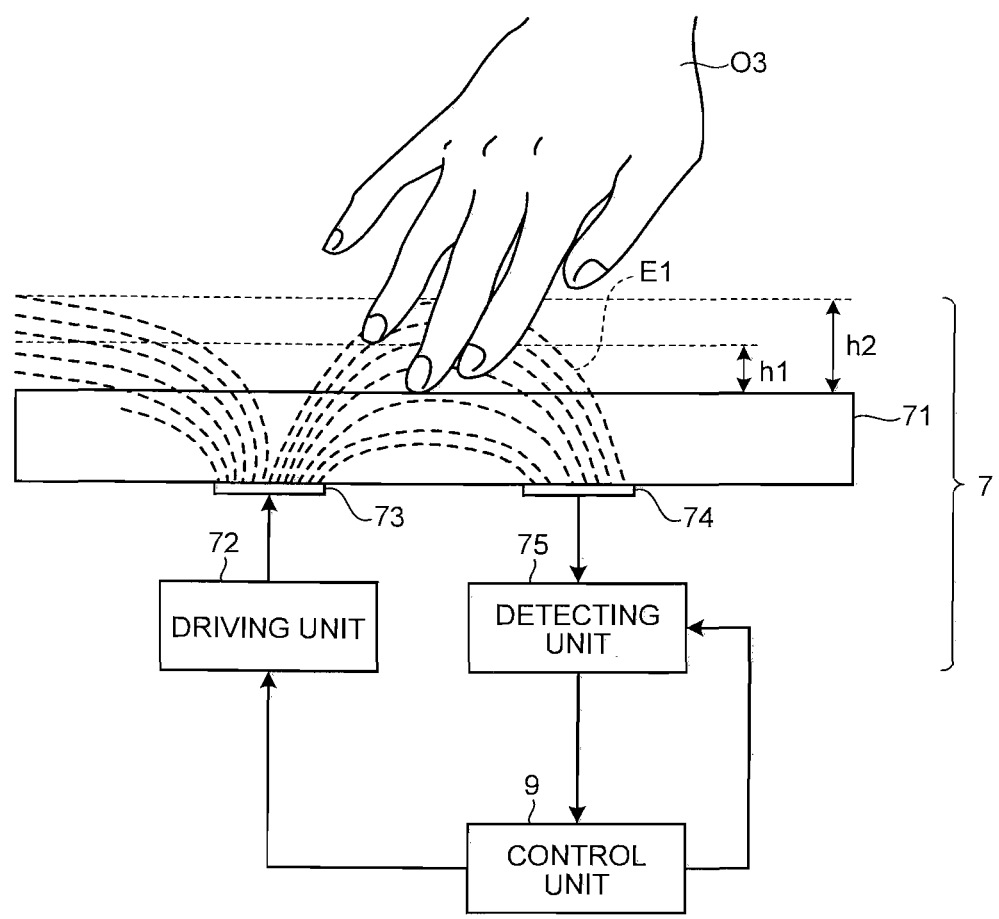
FIG. 3C is a schematic diagram of the configuration of the touch panel included in the display apparatus according to the embodiment of the present invention.

The detecting unit 75 includes a capacitance sensor. When a user's hand O3 comes close to an electric field E1, the detecting unit 75 detects a value about 1 pF as a small change in the capacitance between the driving electrode 73 and the receiving electrode 74, for example, a change caused by a touch on the front panel 71 with the user's hand O3. The detecting unit 75 is disclosed in U.S. Pat. No. 7,148,704. The disclosed technology enables the detecting unit 75 to detect, before the user actually touches the front panel 71 with the hand O3, a small change in the capacitance present between the driving electrode 73 and the receiving electrode 74. More particularly, as illustrated in FIG. 3B, when the fingers O3 are at nearby positions, being on a level h1 (e.g., 0.5 cm) and a level h2 (e.g., 1 cm), the detecting unit 75 detects a change in the capacitance between the driving electrode 73 and the receiving electrode 74 due to a movement between two close positions. Moreover, as illustrated in FIG. 3C, when the finger O3 are at touch positions, being on the front panel 71 and on the level h1, the detecting unit 75 detects a change in the capacitance between the driving electrode 73 and the receiving electrode 74. Moreover, as illustrated in FIG. 3A, when the fingers are at distant positions, being above the level h2, the detecting unit 75 does not detect any change in the capacitance between the driving electrode 73 and the receiving electrode 74.

The touch panel 7 having the above configuration is provided on the display screen of the display unit 6. The touch panel 7 detects a touch position of an external object or a present position of an object being present near the surface and then receives a signal in accordance with the detection result. More particularly, the touch panel 7 detects, in accordance with information displayed on the display unit 6, before the user actually touches the screen of the touch panel 7, a change in the capacitance caused by a change of the electric field present near the display screen and then receives an operation signal in accordance with the position where the change occurs. Moreover, the touch panel 7 having the above configuration is provided on the display screen of the display unit 6 and detects a touch position of an external object or a nearby position of an object being present near the surface. The term "nearby position" means, herein, from a mathematical view especially a geometrical view, any position included in a circle having a center P and an arbitrary radium. The touch panel 7 used in the present embodiment is a capacitive touch panel.

The storage unit 8 includes an image-data storage unit 81 that stores therein image data taken by the imaging unit 2 and a program storage unit 82 that stores therein various programs executed by the display apparatus 1. The storage unit 8 is a semiconductor memory, such as a flash memory and a random access memory (RAM), fixed to an inner section of the display apparatus 1. The storage unit 8 can be configured to have an interface function of writing and reading information to/from an external recording medium, such as a memory card, attached thereto.

The control unit 9 is, for example, a central processing unit (CPU). In response to an operation signal, etc., received from the operation input unit 4, the control unit 9 reads a program from the program storage unit 82 of the storage unit 8, executes the program, and sends an instruction and data to a unit of the display apparatus 1, thereby controlling operations of the display apparatus 1. The control unit 9 includes an image processing unit 91, a 3D-image creating unit 92, a sensitivity setting unit 93, a focus setting unit 94, an aperture setting unit 95, an electronic zooming unit 96, a protrusion setting unit 97, and a display control unit 98.

The image processing unit 91 processes each of left-eye image data received from the signal processing unit 21$h$ and right-eye image data received from the signal processing unit 22$h$ in various manners and outputs the processed data to the image-data storage unit 81 of the storage unit 8. More particularly, the image processing unit 91 processes each of left-eye image data received from the signal processing unit 21$h$ and right-eye image data received from the signal processing unit 22$h$ by using various techniques, such as edge enhancement, color correction, and γ correction.

The 3D-image creating unit 92 creates a 3D image by cutting a left-eye image that corresponds to the left-eye image data processed by the image processing unit 91 and a right-eye image that corresponds to the right-eye image data processed by the image processing unit 91 at a horizontal to vertical ratio for a 3D display mode (e.g., the size corresponding to the aspect ratio 3:4).

The sensitivity setting unit 93 sets, in accordance with a level to which the 3D image displayed on the display unit 6 appears to protrude in a direction perpendicular to the display screen of the display unit 6, the detection sensitivity of the touch panel 7. The sensitivity setting unit 93 sets the detection sensitivity of the touch panel 7 depending on each area of an object that is included in the 3D image and that appears to protrude from the display screen in a direction perpendicular to the display screen.

The focus setting unit 94 focuses the imaging unit 2 on an object that is included in two pieces of image data created by the imaging unit 2 and selected in accordance with a signal received by the touch panel 7. More particularly, the focus setting unit 94 drives the lens driving units 21$b$ and 22$b$ and moves the lens units 21$a$ and 22$a$ along the optical axes L1 and L2 in a synchronized manner so that the sharpness of the areas of the two pieces of image data that correspond to the capacitance changing area detected by the touch panel 7 is at the highest.

The aperture setting unit 95 conducts exposure adjustment by setting shooting conditions, such as the setting values of the apertures 21$c$ and 22$c$ and the shutter speed, in accordance with image data output from the signal processing units 21$h$ and 22$h$.

The electronic zooming unit 96 enlarges a part of an object that is included in two pieces of image data created by the imaging unit 2 and selected in accordance with a signal received by the touch panel 7. More particularly, the electronic zooming unit 96 enlarges areas of the two pieces of image data that correspond to the capacitance changing area detected by the touch panel 7 at a predetermined magnification, for example, double.

The protrusion setting unit 97 adjusts, for an object that is included in two pieces of image data created by the imaging unit 2 and selected in accordance with a signal received by the touch panel 7, a parallax in the two pieces of image data, thereby setting the level to which the object appears to protrude from the display screen of the display unit 6 in the direction perpendicular to the display screen. More particularly, the protrusion setting unit 97 adjusts the area of the left-eye image and the area of the right-eye image that correspond to the capacitance changing area detected by detected by the touch panel 7 so as to increase the parallax, thereby setting the level to which the object included in the 3D image appears to protrude from the display screen of the display unit 6 in the direction perpendicular to the display screen.

The display control unit 98 displays a 3D image or a 2D image created by the 3D-image creating unit 92 on the display unit 6. More particularly, when a 3D image is displayed on the display unit 6, the display control unit 98 splits the left-eye image and the right-eye image of the 3D image both created by the 3D-image creating unit 92 into strips, arranges the strip images, alternately in the horizontal direction of the display screen of the display unit 6 one pixel by one pixel, thereby displaying the 3D image on the display unit 6. In contrast, when a 2D image is displayed on the display unit 6, in order to shift the slits of the parallax barrier 63 of the display unit 6 from the shielded mode to the permeable mode, the power applied to the parallax barrier 63 is switched OFF and either the left-eye image or the right-eye image is displayed on the display panel 62. Moreover, the display control unit 98 changes the 3D display mode of the object that is included in the 3D image displayed on the display unit 6 and selected in accordance with the signal received by the touch panel 7. More particularly, the display control unit 98 displays, on the display unit 6, a 3D image created by using two pieces of image data in which an object is focused on by the focus setting unit 94 or an enlarged 3D image created by using two pieces of image data that are enlarged by the electronic zooming unit 96.

Figure 4:
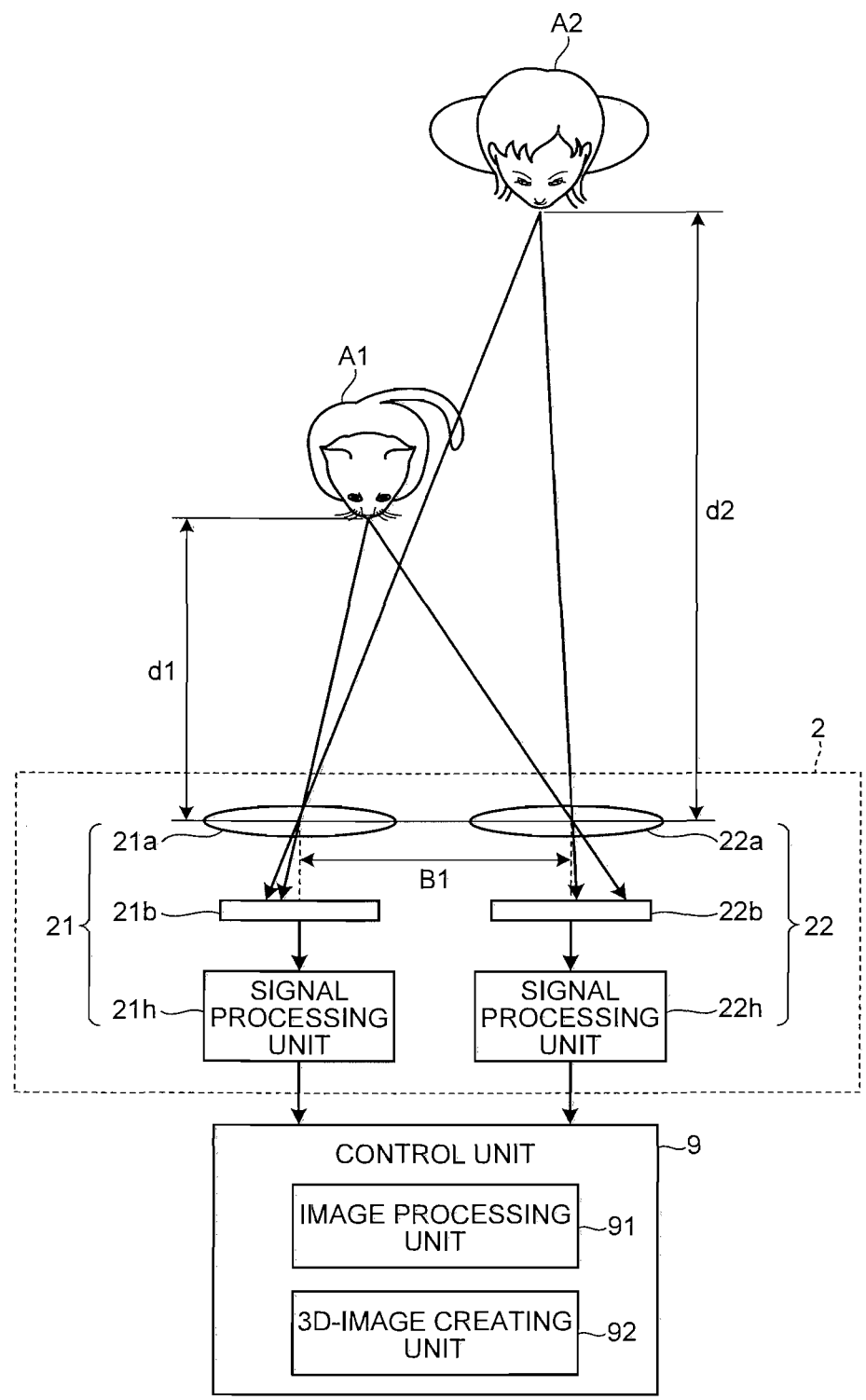
FIG. 4 is a schematic diagram that illustrates a situation where an imaging unit included in the display apparatus according to the embodiment of the present invention creates two pieces of image data in which parts of the respective field of view overlap with each other.
Figure 5:
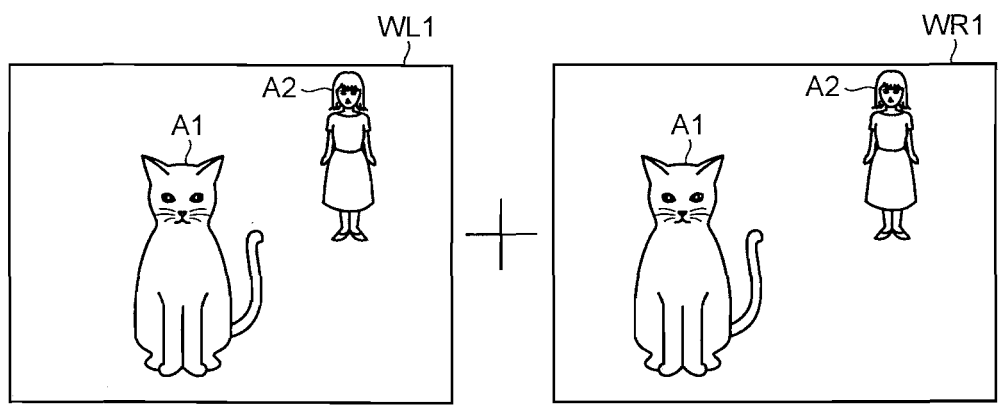
FIG. 5 is a schematic diagram of examples of two images that correspond to two pieces of image data created by the imaging unit in the situation illustrated in FIG. 4 in which adjacent right-side and left-side parts of the respective fields of view overlap with each other.
Figure 6:
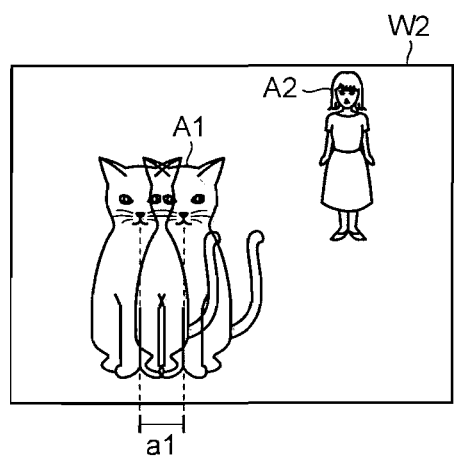
FIG. 6 is a schematic diagram of an example of an imaginary image created by overlapping the right-eye image and the left-eye image that are in turn created by the imaging unit of the scene depicted in FIG. 4.
Figure 7:
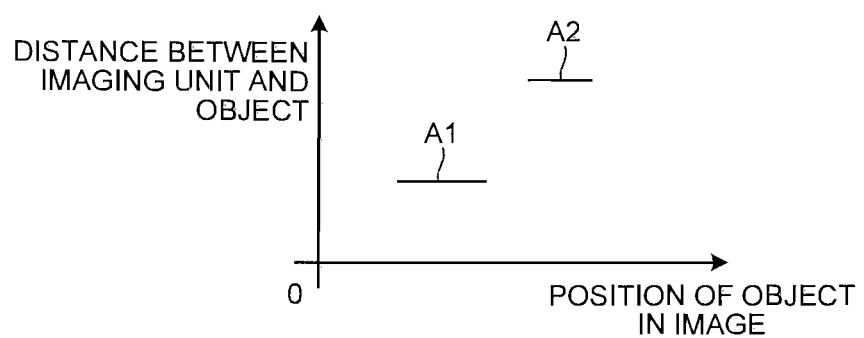
FIG. 7 is a graph that illustrates the relation between the distance from the imaging unit to a object and the position of the object in the image, in accordance with the scene depicted in FIG. 4.

A situation is described below where, in the display apparatus 1 having the above configuration, the imaging unit 2 creates two pieces of image data in which adjacent right-sided and left-sided parts of respective field views overlap with each other. FIG. 4 is a schematic diagram that illustrates a situation where the imaging unit 2 creates two pieces of image data in which adjacent right-sided and left-sided parts of respective field views overlap with each other. FIG. 5 is a schematic diagram of examples of two images that correspond to two pieces of image data created by the imaging unit 2 in the situation illustrated in FIG. 4 in which adjacent right-sided and left-sided parts of respective field views overlap with each other. An image WR1 of FIG. 5 is a right-eye image that corresponds to the image data created by the first imaging unit 21. An image WL1 of FIG. 5 is a left-eye image that corresponds to the image data created by the second imaging unit 22. FIG. 6 is a schematic diagram of an example of an imaginary image created by overlapping the right-eye image and the left-eye image that are in turn created by the imaging unit 2 of the scene depicted in FIG. 4. FIG. 7 is a graph that illustrates the relation of the distance from the imaging unit 2 to an object and the position of the object in the image, in accordance with the scene depicted in FIG. 4. The horizontal axis of FIG. 7 is the position of an object included in an image W2, where the left-sided point being the origin. The vertical axis is the distance between the imaging unit 2 and an object.

As illustrated in FIG. 4, the imaging unit 2 takes images of an object A1 and a object A2 by using the first imaging unit 21 and the second imaging unit 22. The object A1 is at a position a distance d1 away from the imaging unit 2 and the object A2 is at a position a distance d2 away. The first imaging unit 21 and the second imaging unit 22 are arranged side by side spaced a distance B1 away from each other. Thus, the imaging unit 2 creates right-eye image data and left-eye image data. More particularly, the first imaging unit 21 creates the right-eye image WR1 and the second imaging unit 22 creates the left-eye image WL1 (see FIG. 5). As illustrated in FIGS. 4 and 5, because the object A2 is farther away from the imaging unit 2 than the object A1, the areas of the object A2 substantially overlap with each other. More particularly, as illustrated in FIG. 6, on the image W2, the areas of the object A2 substantially overlap with each other. In contrast, because the object A1 is closer to the imaging unit 2 than the object A2, the areas of the object A1 do not overlap with each other. More particularly, as illustrated in FIG. 6, on the image W2, the areas of the object A1 do not overlap with each other and therefore the object A1 has a parallax a1. In other words, as illustrated in FIGS. 4 and 7, a object closer to the imaging unit 2 (the object A1) has a larger parallax and an object farther away from the imaging unit 2 (the object A2) has a smaller parallax. As described above, the 3D-image creating unit 92 creates a 3D image by cutting a right-eye image out of right-eye image data and a left-eye image out of left-eye image data so that the object has a parallax; the display control unit 98 displays the 3D image on the display unit 6. As a result, the user can see the image in a realistic 3D vision.

Figure 8:
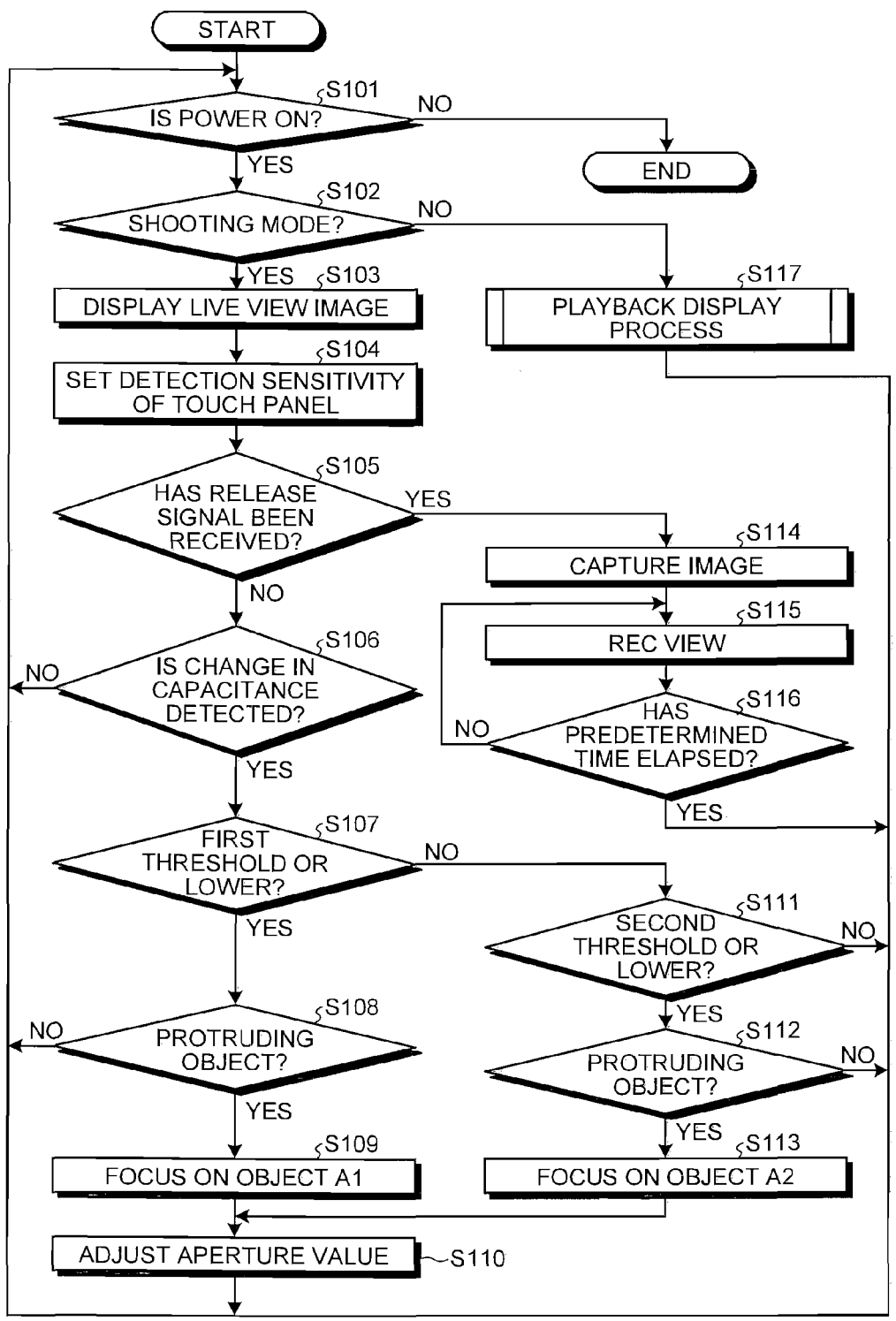
FIG. 8 is a flowchart of a general process performed by the display apparatus according to the embodiment of the present invention.

The processes performed by the display apparatus 1 are described according to the present embodiment. FIG. 8 is a flowchart of the general process performed by the display apparatus 1.

As illustrated in FIG. 8, the control unit 9 determines whether the display apparatus 1 is powered on (Step S101). If the display apparatus 1 is powered on (Step S101: Yes), the display apparatus 1 goes to Step S102. If the display apparatus 1 is powered off (Step S101: No), the display apparatus 1 finishes the process.

The control unit 9 determines whether the display apparatus 1 is in a shooting mode (Step S102). If the display apparatus 1 is in a shooting mode (Step S102: Yes), the display apparatus 1 goes to later-described Step S103. If the display apparatus 1 is not in a shooting mode (Step S102: No), the display apparatus 1 goes to later-described Step S117.

The processes that are performed if the display apparatus 1 is in a shooting mode (Step S102: Yes) are described below. In this case, the display unit 6 displays a 3D live view image in accordance with image data that is created by the imaging unit 2 continuously at fixed small time intervals (Step S103).

Figure 9:
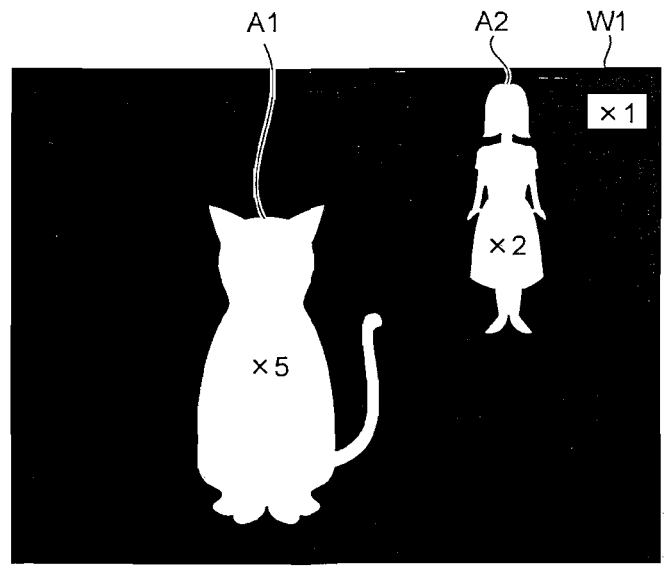
FIG. 9 is a schematic diagram of an example of the sensitivity distribution of the detection sensitivity on the touch panel set by a sensitivity setting unit included in the display apparatus according to the embodiment of the present invention.

After that, the sensitivity setting unit 93 sets, in accordance with the level to which the 3D image displayed on the display unit 6 appears to protrude in the direction perpendicular to the display screen of the display unit 6 (hereinafter, "protrusion level"), the detection sensitivity of the touch panel 7 that depends on the capacitance present above the display screen of the display unit 6 in the direction perpendicular to the display screen (Step S104). As illustrated in FIG. 9, the sensitivity setting unit 93 sets the detection sensitivity of the touch panel 7 depending on each area of an object included in the 3D image.

FIG. 9 is a schematic diagram of an example of the sensitivity distribution of the detection sensitivity on the touch panel 7 set by the sensitivity setting unit 93. As illustrated in FIG. 9, the sensitivity setting unit 93 sets the sensitivity of the area of the object A1 that is included in a 3D image W1 displayed on the display unit 6 to a value five times as high as the detection sensitivity of the background area, where a change in the capacitance due to a touch on the background area is 1 pF. More particularly, the sensitivity setting unit 93 sets the detection sensitivity of the touch panel 7 so as to receive a signal for the area of the object A1 when the detecting unit 75 detects a change 0.2 pF (first threshold) in the capacitance on the area of the object A1. Moreover, the sensitivity setting unit 93 sets the detection sensitivity of the area of the object A2 that is included in the 3D image W1 to a value twice as high as the detection sensitivity of the background area. More particularly, the sensitivity setting unit 93 sets the detection sensitivity of the touch panel 7 so as to receive a signal for the area of the object A2 when the detecting unit 75 detects a change 0.5 pF (second threshold) in the capacitance on the area of the object A2. With this adjustment, the display apparatus 1 can align a level to which the 3D image displayed on the display unit 6 appears to protrude with a level on which the touch panel 7 can detect actions. The above percentages of detection sensitivity set by the sensitivity setting unit 93 are merely examples. The detection sensitivity can be set appropriately depending on the performance of the touch panel 7 and the performance of the detecting unit 75.

The control unit 9 determines, at Step S105, whether a user presses the release switch 42 and a release signal indicative of a shooting instruction is received. If a release signal indicative of a shooting instruction is received (Step S105: Yes), the display apparatus 1 goes to later-described Step S114. If no release signal indicative of a shooting instruction is received (Step S105: No), the display apparatus 1 goes to later-described Step S106.

The processes that are performed if no release signal indicative of a shooting instruction is received (Step S105: No) are described below. In this case, the control unit 9 determines whether the touch panel 7 detects any change in the capacitance (Step S106). More particularly, when the detecting unit 75 of the touch panel 7 detects any change in the capacitance present between the driving electrode 73 and the receiving electrode 74, the control unit 9 determines whether a signal that corresponds to the capacitance changing position is received. If the touch panel 7 detects no change in the capacitance (Step S106: No), the display apparatus 1 returns to Step S101. On the other hand, if the touch panel 7 detects a change in the capacitance (Step S106: Yes), the display apparatus 1 goes to Step S107.

After that, the control unit 9 determines whether the amount of the change in the capacitance detected by the touch panel 7 is equal to or lower than the first threshold (Step S107). More particularly, the control unit 9 determines whether the amount of the change in the capacitance detected by the touch panel 7 is 0.2 pF or lower. If the amount of the change in the capacitance detected by the touch panel 7 is the first threshold or lower (Step S107: Yes), the display apparatus 1 goes to later-described Step S108. On the other hand, the amount of the change in the capacitance detected by the touch panel 7 is higher than the first threshold (Step S107: No), the display apparatus 1 goes to later-described Step S111.

The control unit 9 determines, at Step S108, whether the image on the capacitance changing area detected by the touch panel 7 is an image on an area that includes a protruding object. More particularly, as illustrated in FIG. 4, the control unit 9 determines whether the image on the capacitance changing area detected by the touch panel 7 is the image on the area of the object A1. If the image on the capacitance changing area detected by the touch panel 7 is not an image on an area that includes a protruding object (Step S108: No), the display apparatus 1 returns to Step S101. On the other hand, if the image on the capacitance changing area detected by the touch panel 7 is an image on an area that includes a protruding object (Step S108: Yes), the display apparatus 1 goes to Step S109.

At Step S109, the focus setting unit 94 focuses on the object A1 (Step S109). More particularly, the focus setting unit 94 drives the lens driving units 21b and 22b and moves the lens units 21a and 22a along the optical axes L1 and L2 in a synchronized manner so that the sharpness of the object A1 becomes the highest.

After that, the aperture setting unit 95 adjusts an aperture value of the imaging unit 2 (Step S110) and the display apparatus 1 returns to Step S101. More particularly, the aperture setting unit 95 drives the aperture driving units 21d and 22d and opens the apertures 21c and 22c in a synchronized manner to increase the aperture values to a predetermined value.

Figure 10:
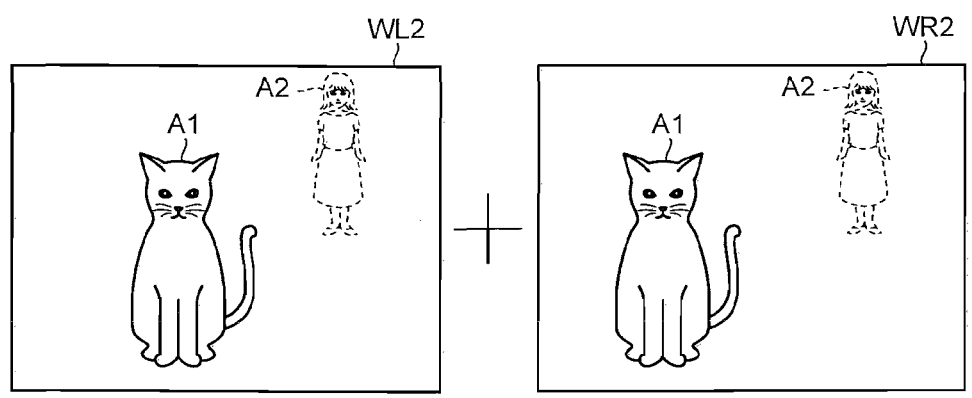
FIG. 10 illustrates examples of images created by the imaging unit included in the display apparatus according to the embodiment of the present invention.

FIG. 10 illustrates examples of images created by the imaging unit 2. An image WL2 of FIG. 10 is an image that corresponds to image data created by the first imaging unit 21. An image WR2 is an image that corresponds to image data created by the second imaging unit 22. As illustrated in FIG. 10, the focus setting unit 94 focuses on the object A1 and the aperture setting unit 95 adjusts an aperture values of the apertures 21c and 22c, which defocuses anything other than the image including the capacitance changing area detected by the touch panel 7, such as the background and an object far away from the imaging unit 2. In FIG. 10, a defocused image is indicated by a broken line. With this configuration, when the display unit 6 displays image data taken by the imaging unit 2, the display apparatus 1 displays the object selected by the user in such a manner that the object appears to protrude, with the edge being more sharpened, from the display screen of the display unit 6 in the direction perpendicular to the display screen.

The processes performed when the amount of the change in the capacitance detected by the touch panel 7 is higher than the first threshold (Step S107: No) are described below. In this case, the control unit 9 determines whether the amount of the change in the capacitance detected by the touch panel 7 is equal to or lower than the second threshold (Step S111). More particularly, the control unit 9 determines whether the amount of the change in the capacitance detected by the touch panel 7 is 0.5 pF or lower. If the amount of the change in the capacitance detected by the touch panel 7 is higher than the second threshold (Step S111: No), the display apparatus 1 returns to Step S101. On the other hand, if the amount of the change in the capacitance detected by the touch panel 7 is equal to or lower than the second threshold (Step S111: Yes), the display apparatus 1 goes to Step S112.

At Step S112, the control unit 9 determines that the image on the capacitance changing area detected by the touch panel 7 is an image on an area that includes a protruding object (Step S112). More particularly, as illustrated in FIG. 4, the control unit 9 determines whether the image on the capacitance changing area detected by the touch panel 7 is the image on the area of the object A2. If the image on the capacitance changing area detected by the touch panel 7 is not an image on an area that partially includes a protruding object (Step S112: No), the display apparatus 1 returns to Step S101. On the other hand, if the image on the capacitance changing area detected by the touch panel 7 is an image on an area that partially includes a protruding object (Step S112: Yes), the display apparatus 1 goes to Step S113.

At Step S113, the focus setting unit 94 focuses the imaging unit 2 on the object A2 (Step S113) and the display apparatus 1 goes to Step S110. More particularly, the focus setting unit 94 focuses the imaging unit 2 on the object A2, which is far away from the imaging unit 2. With this adjustment, when the apertures 21c and 22c are opened, the display apparatus 1 acquires image data in which nearby objects are defocused, which makes the object A2 appeared to be in the depth.

The processes that are performed if the user presses the release switch 42 and a release signal indicative of a shooting instruction is received (Step S105: Yes) are described below. In this case, the imaging unit 2 captures an image currently being displayed on the display unit 6 and stores the captured image data in the image-data storage unit 81 of the storage unit 8 (Step S114).

After that, the display control unit 98 displays, in a REC view mode, a 3D image that corresponds to the image data captured by the imaging unit 2 on the display unit 6 (Step S115).

After that, the control unit 9 determines whether a predetermined time, for example, 30 seconds has elapsed since the 3D image was displayed on the display unit 6 in the REC view mode (Step S116). If it is within the predetermined time after the 3D image is displayed on the display unit 6 in the REC view mode (Step S116: No), the display apparatus 1 returns to Step S115. On the other hand, if the predetermined time has elapsed since the 3D image was displayed on the display unit 6 in the REC view mode (Step S116: Yes), the display apparatus 1 returns to Step S101.

The processes performed if the display apparatus 1 is not in a shooting mode (Step S102: No) are described below. In this case, the control unit 9 performs a playback display process to display taken image data on the display unit 6 (Step S117), and the display apparatus 1 returns to Step S101.

Figure 11:
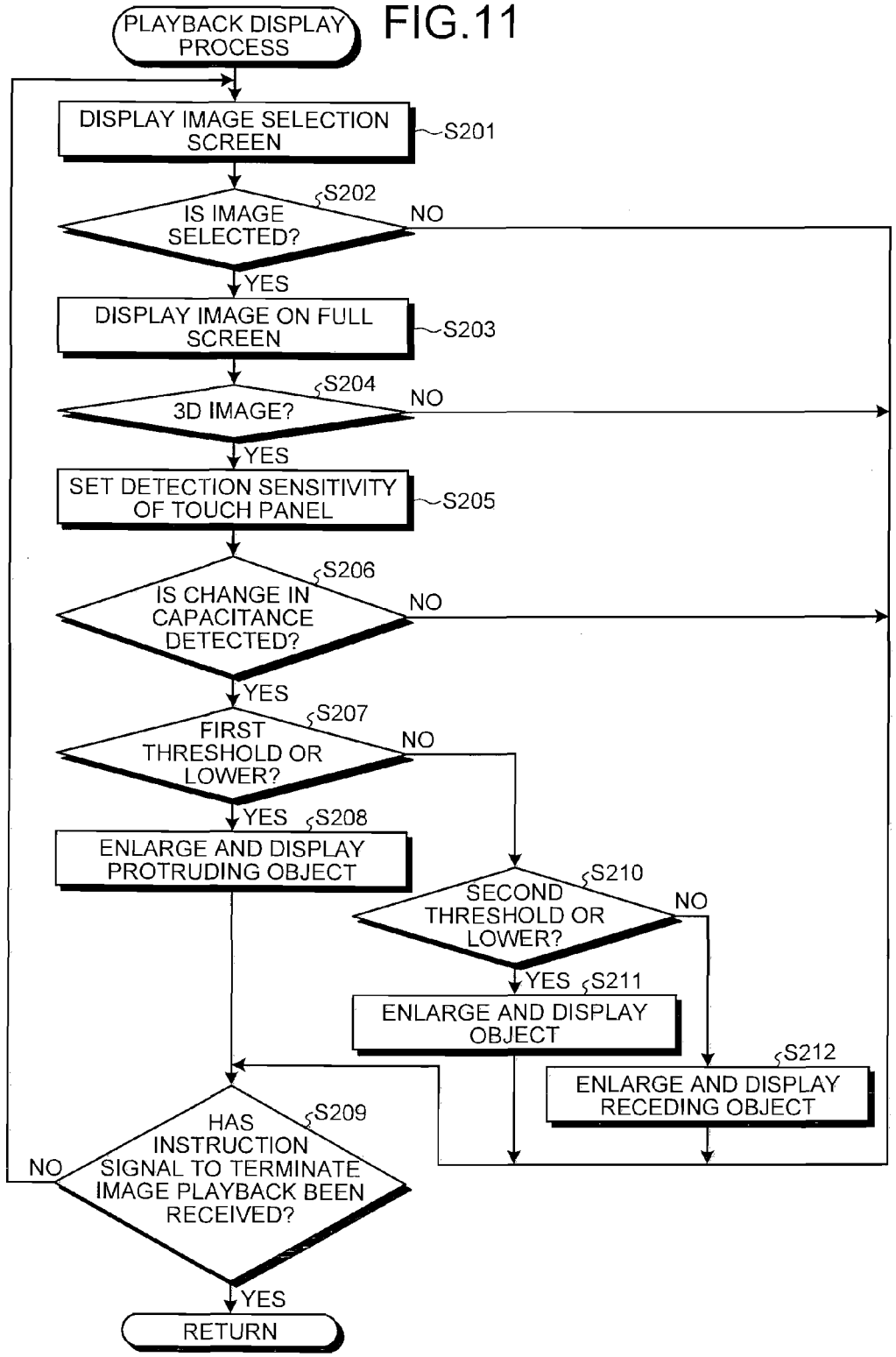
FIG. 11 is a flowchart of the playback display process illustrated in FIG. 8.

The playback display process at Step S117 is described below. FIG. 11 is a flowchart of the playback process. In FIG. 11, the display control unit 98 displays, on the display unit 6, an image selection screen that includes a plurality of images stored in the image-data storage unit 81 (Step S201).

After that, the control unit 9 determines whether the user manipulates the touch panel 7 and selects an image from the image selection screen displayed on the display unit 6 (Step S202). If the user selects an image from the image selection screen (Step S202: Yes), the display apparatus 1 goes to later-described Step S203. On the other hand, if the user does not select any image from the image selection screen (Step S202: No), the display apparatus 1 goes to later-described Step S209.

The processes performed if the user selects an image from the image selection screen (Step S202: Yes) are described. In this case, the display control unit 98 displays the image selected by the user on the full screen of the display unit 6 (Step S203), and the display apparatus 1 goes to Step S204.

After that, the control unit 9 determines whether the image displayed on the display unit 6 is a 3D image (Step S204). More particularly, the control unit 9 refers to an image file of the image currently being displayed and determines whether header information included in the image file contains 3D image information indicating that the image is a 3D image. If the image displayed on the display unit 6 is a 3D image (Step S204: Yes), the sensitivity setting unit 93 sets, in accordance with the protrusion level of the 3D image displayed on the display unit 6, the detection sensitivity depending on the capacitance detected by the touch panel 7 above the display screen of the display unit 6 in the direction perpendicular to the display screen (Step S205).

After that, the control unit 9 determines whether the touch panel 7 detects a change in the capacitance (Step S206). If the touch panel 7 detects no change in the capacitance (Step S206: No), the display apparatus 1 goes to later-described Step S209. On the other hand, if the touch panel 7 detects a change in the capacitance (Step S206: Yes), the display apparatus 1 goes to Step S207.

At Step S207, the control unit 9 determines whether the amount of the change in the capacitance detected by the touch panel 7 is equal to or lower than the first threshold. If the amount of the change in the capacitance detected by the touch panel 7 is equal to or lower than the first threshold (Step S207: Yes), the display control unit 98 causes the electronic zooming unit 96 to enlarge the area that partially includes a protruding object included in the 3D image displayed on the display unit 6, thereby creating an enlarged 3D image and then displays the enlarged 3D image on the display unit 6 (Step S208).

Figure 12:
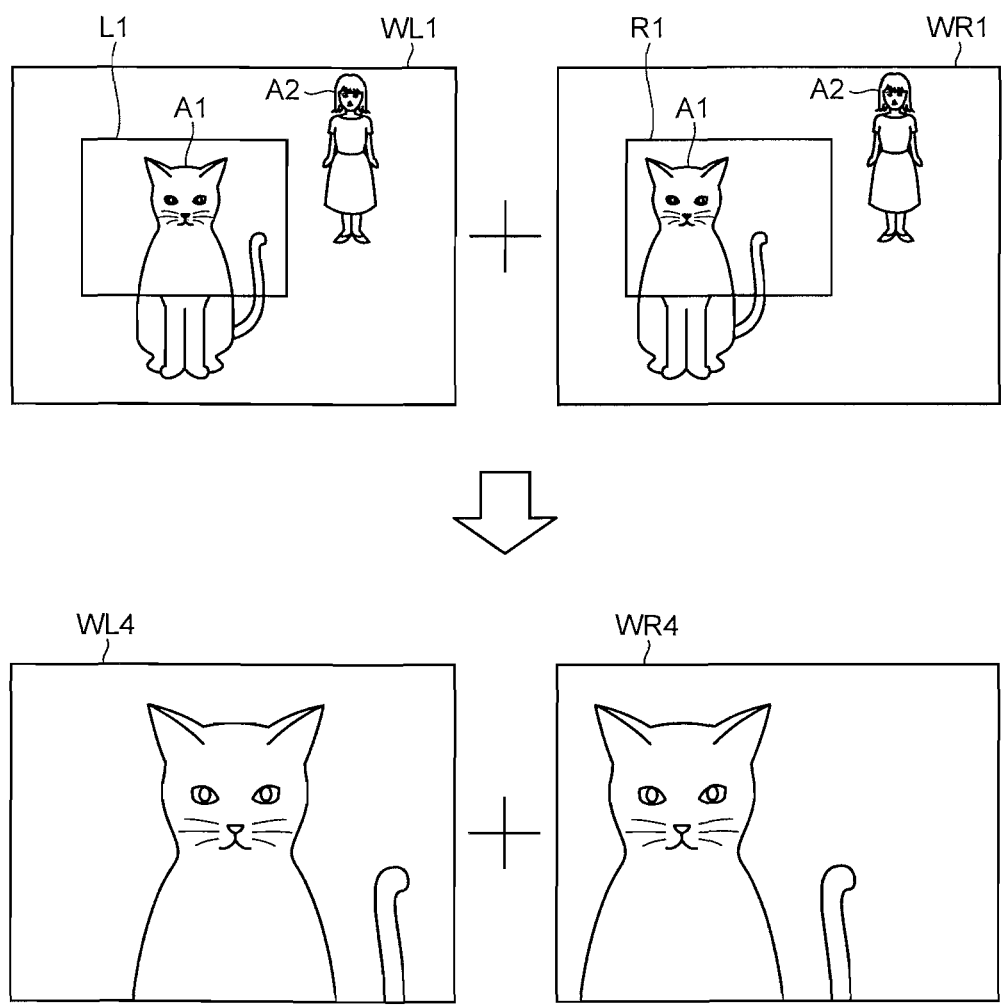
FIG. 12 is a schematic diagram that explains a way in which an electronic zooming unit included in the display apparatus according to the embodiment of the present invention creates an enlarged 3D image.

FIG. 12 is a schematic diagram that explains a way in which the electronic zooming unit 96 creates an enlarged 3D image. As illustrated in FIG. 12, the electronic zooming unit 96 extracts an area L1 from the image WL1 created by the second imaging unit 22 and an area R1 from the image WR1 created by the first imaging unit 21 so that both of the areas L1 and R1 include a part of the area of the object A1 that is on the capacitance changing area detected by the touch panel 7. The electronic zooming unit 96 then creates enlarged images WL4 and WR4. The display control unit 98 displays, on the display unit 6, the enlarged images WL4 and WR4 that are created by the electronic zooming unit 96 based on the images WL1 and WR1, so that the user sees the enlarged 3D image.

Referring back to FIG. 11, the process of Step S209, which is subsequent to Step S208, is described below. At Step S209, the control unit 9 determines whether the user presses the change-over switch 43 and a termination instruction signal is received to terminate the image playback. If no termination instruction signal is received (Step S209: No), the display apparatus 1 returns to Step S201. On the other hand, if a termination instruction signal is received to terminate the image playback (Step S209: Yes), the display apparatus 1 returns to the main routine of FIG. 8.

The processes performed if the amount of the change in the capacitance detected by the touch panel 7 is higher than the first threshold (Step S207: No) are described below. In this case, the control unit 9 determines whether the amount of the change in the capacitance detected by the touch panel 7 is equal to or lower than the second threshold (Step S210). If the amount of the change in the capacitance detected by the touch panel 7 is equal to or lower than the second threshold (Step S210: Yes), the display control unit 98 causes the electronic zooming unit 96 to create an enlarged image of the area that includes the object included in the 3D image displayed on the display unit 6 and displays the enlarged 3D image on the display unit 6 (Step S211). More particularly, the electronic zooming unit 96 enlarges an area of an object having a small parallax that is included in both the image created by the first imaging unit 21 and the image created by the second imaging unit 22, thereby creating an enlarged 3D image.

At Step S210, the processes performed when the amount of the change in the capacitance detected by the touch panel 7 is higher than the second threshold (Step S210: No) are described below. In this case, the display control unit 98 causes the electronic zooming unit 96 to create an enlarged 3D image of the area that partially includes a receding object included in the 3D image displayed on the display unit 6 and displays the enlarged 3D image on the display unit 6 (Step S212).

As described above, in the present embodiment, the sensitivity setting unit 93 sets the detection sensitivity of the touch panel 7 in accordance with the protrusion level of the 3D image displayed on the display unit 6; therefore, the protrusion level of the 3D image displayed on the display unit 6 is aligned with the level on which the touch panel 7 can detect actions. As a result, when a user makes an action on the 3D image displayed on the screen, the user will make the action without uncomfortable feelings. Moreover, the sensitivity setting unit 93 sets the detection sensitivity of the touch panel 7 depending on each area of an object included in a 3D image. Therefore, even if a 3D image displayed on the display unit 6 includes a plurality of objects each having different protrusion levels, the user can make an action intuitively without uncomfortable feelings.

Figure 13:
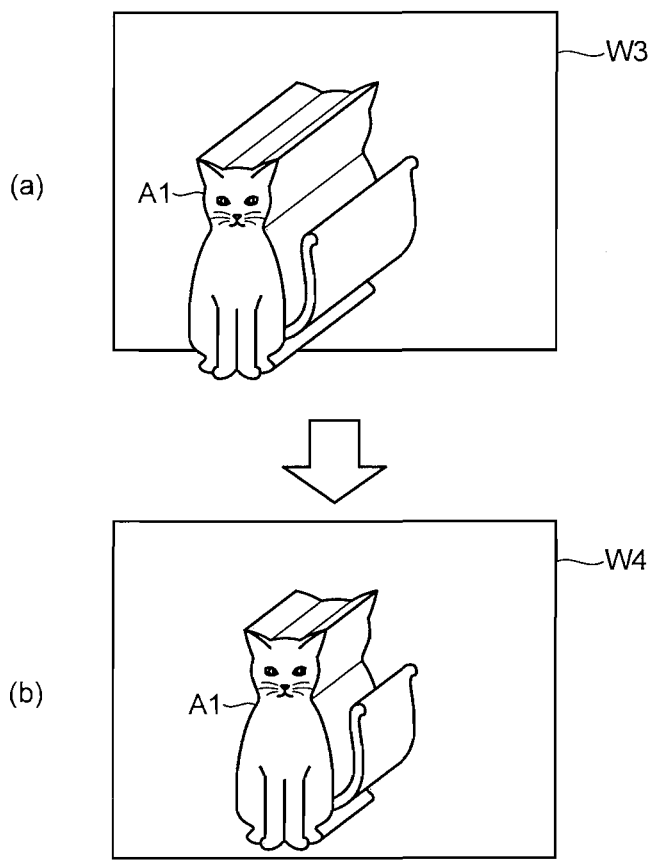
FIG. 13 is a schematic diagram that illustrates a way in which a protrusion setting unit included in the display apparatus according to the embodiment of the present invention sets the depth of a object included in a 3D image displayed on the display unit.

Although, during the playback display process according to the present embodiment, the electronic zooming unit 96 enlarges, in accordance with a capacitance changing position on the touch panel 7, an object included in a 3D image, thereby creating an enlarged 3D image, it is allowable to set the depth of the object included in the 3D image in accordance with the capacitance changing position on the touch panel 7. FIG. 13 is a schematic diagram that illustrates the way in which the protrusion setting unit 97 sets the depth of an object included in a 3D image displayed on the display unit 6. As illustrated in FIG. 13, the protrusion setting unit 97 moves the object A1 ((a) of FIG. 13), which appears to protrude above an image W3 in the vertical direction, a predetermined distance behind in the vertical (depth) direction toward the image W3 (FIG. 13(b)), thereby adjusting the protrusion level of the object included in the 3D image displayed on the display unit 6. More particularly, the protrusion setting unit 97 conducts adjustment to decrease the parallax of the object A1 that is included in both the image created by the first imaging unit 21 and the image created by the second imaging unit 22, thereby adjusting the level to which the object A1 appears to protrude above the image W3 in the vertical direction. With this adjustment, the user can set the protrusion level of an object included in a 3D image displayed on the display unit 6 to a desired level.

Although, in the above present embodiment, the imaging unit 2 creates two pieces of image data in which adjacent right-sided and left-sided parts of respective field views overlap with each other, it is allowable, for example, to take images continuously by one imaging unit, thereby creating two pieces of image data in which adjacent right-sided and left-sided parts of respective field views overlap with each other.

Although, in the above present embodiment, the detecting unit 75 of the touch panel 7 detects a change in the capacitance, it is allowable, for example, to provide an optical sensor that detects light reflected from outside of the display unit 6 of light emitted from the backlight 61 and set the detection sensitivity of the reflected light detected by the optical sensor.

Although, in the above present embodiment, the electronic zooming unit 96 and the protrusion setting unit 97 process image data stored in the image-data storage unit 81, it is allowable to process, for example, an image that is displayed on the display unit 6 in the REC view mode immediately after it is taken.

Although, in the above present embodiment, the display unit 6 uses a parallax barrier technology, any technology can be used that enables a user to see a 3D image in a stereoscopic vision. For example, it is allowable to use a lenticular technology in which, instead of the parallax barrier 63, a lens sheet with a lenticular lens formed thereon is formed on the top surface of the display panel 62.

Although, in the above present embodiment, the display apparatus 1 is a digital stereo camera, the technology can be applied to various electric devices having a shooting function and a display function, such as a digital video camera and a camera cell-phone.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
   a display unit that displays a 3D image thereon, the 3D image being created by combining two pieces of image data in which adjacent right-side and left-side parts of respective fields of view overlap with each other;
   a touch panel that is provided on a display screen of the display unit and that detects a touch position of an external object or a nearby position of an object near a surface of the touch panel;
   a sensitivity setting unit that sets, in accordance with a level to which the 3D image appears to protrude in a direction perpendicular to the display screen, a detection sensitivity of the touch panel depending on capacitance;
   an imaging unit that includes a lens configured to focus and condense light and an imaging element configured to convert the light condensed by the lens into an electric signal, the imaging unit being configured to capture images from different positions and creates two pieces of image data in which adjacent right-side and left-side parts of respective fields of view overlap with each other;
   a display control unit that arranges the two pieces of image data created by the imaging unit alternately one pixel by one pixel in a horizontal direction on the display screen and outputs the arranged image data to the display unit, thereby displaying the 3D image on the display unit; and
   a focus setting unit that focuses the imaging unit on an object that is included in the two pieces of image data and selected by using the touch panel;
   wherein the sensitivity setting unit detects a background area and an object area for each object in the 3D image, sets the detection sensitivity of the background area of the touch panel, and sets the detection sensitivity of the object area at a percentage according to the capacitance relative to the detection sensitivity of the background area and based on an area of each object included in the 3D image, such that the object area for each object displayed in the 3D image corresponds with the detection sensitivity of each corresponding object area of the touch panel; and
   the display control unit displays the 3D image on the display unit by using the two pieces of image data that contain the object being focused on by the focus setting unit.

2. The display apparatus according to claim 1, wherein the display control unit changes a 3D display mode of an object, the object being included in the 3D image displayed on the display unit and selected by using the touch panel.

3. The display apparatus according to claim 1, further comprising an electronic zooming unit that enlarges a part of an object that is included in the two pieces of image data and selected by using the touch panel, wherein the display control unit displays, by using the two pieces of image data that are enlarged by the electronic zooming unit, a 3D image on the display unit.

4. The display apparatus according to claim 1, further comprising a protrusion setting unit that adjusts, for an object that is included in the two pieces of image data and is selected by using the touch panel, a parallax in the two pieces of image data, thereby setting a level to which the object appears to protrude from the display screen in the direction perpendicular to the display screen, wherein
the display control unit displays the 3D image on the display unit so that the object appears to protrude to the level set by the protrusion setting unit.

5. A display method performed by a display apparatus that can display a 3D-image and includes a touch panel provided on a display screen of a display unit, the method comprising:
displaying a 3D image that is created by combining two pieces of image data in which adjacent right-side and left-side parts of respective fields of view overlap with each other;
detecting a touch position of an external object or a nearby position of an object near a surface of the touch panel;
setting, when the nearby position of the object is detected, a detection sensitivity of the touch panel depending on capacitance in accordance with a level to which the 3D image appears to protrude in a direction perpendicular to the display screen;
capturing images at different positions using an imager including a lens includes configured to focus and condense light and an imaging element configured to convert the light condensed by the lens into an electric signal, thereby creating two pieces of image data in which adjacent right-side and left-side parts of respective fields of view overlap with each other; and
arranging the two pieces of image data alternately one pixel by one pixel in a horizontal direction on the display screen and outputting the arranged image data to the display unit;
focusing on an object that is included in the two pieces of image data and selected by using the touch panel; and
displaying the 3D image on the display unit by using the two pieces of image data that contain the object being focused;
wherein a background area and an object area for each object in the 3D image is detected, the detection sensitivity of the background area of the touch panel is set, and the detection sensitivity of the object area is set at a percentage according to the capacitance relative to the detection sensitivity of the background area and based on an area of each object included in the 3D image, such that the object area for each object displayed in the 3D image corresponds with the detection sensitivity of each corresponding object area of the touch panel.

6. The display method according to claim 5, further comprising changing a 3D display mode of an object, the object being included in the 3D image displayed on the display unit and selected by using the touch panel.

7. The display method according to claim 5, further comprising:
enlarging a part of an object that is included in the two pieces of image data and selected by using the touch panel; and
displaying, by using the two pieces of image data that contain the enlarged part of the object, a 3D image on the display unit.

8. The display method according to claim 5, further comprising:
adjusting, for an object that is included in the two pieces of image data and that is selected by using the touch panel, a parallax in the two pieces of image data, thereby setting a level to which the object appears to protrude from the display screen in the direction perpendicular to the display screen; and
displaying the 3D image on the display unit so that the object appears to protrude to the level.

9. A non-transitory computer-readable storage medium with an executable program stored thereon, wherein the program instructs a processor included in a display apparatus that includes a touch panel provided on a display screen of a display unit, to perform:
displaying a 3D image that is created by combining two pieces of image data in which adjacent right-side and left-side parts of respective fields of view overlap with each other;
detecting a touch position of an external object or a nearby position of an object near a surface of the touch panel;
setting, when the nearby position of the object is detected, a detection sensitivity of the touch panel in accordance with a level to which the 3D image appears to protrude in a direction perpendicular to the display screen;
capturing images at different positions using an imager including a lens includes configured to focus and condense light and an imaging element configured to convert the light condensed by the lens into an electric signal, thereby creating two pieces of image data in which adjacent right-side and left-side parts of respective fields of view overlap with each other; and
arranging the two pieces of image data alternately one pixel by one pixel in a horizontal direction on the display screen and outputting the arranged image data to the display unit;
focusing on an object that is included in the two pieces of image data and selected by using the touch panel; and
displaying the 3D image on the display unit by using the two pieces of image data that contain the object being focused;
wherein a background area and an object area for each object in the 3D image is detected, the detection sensitivity of the background area of the touch panel is set, and the detection sensitivity of the object area is set at a percentage according to the capacitance relative to the detection sensitivity of the background area and based on an area of each object included in the 3D image, such that the object area for each object displayed in the 3D image corresponds with the detection sensitivity of each corresponding object area of the touch panel.

10. The display apparatus according to claim 1, further comprising a mode setting unit configured to set the display apparatus to be in a shooting mode or in a playback mode, wherein
when the display apparatus is in the shooting mode, the focus setting unit is configured to focus the imaging unit based on data regarding the detected nearby position of the object near the surface of the touch panel and on a position of the 3D image.

11. The display apparatus according to claim 1, further comprising a mode setting unit configured to set the display apparatus to be in a shooting mode or in a playback mode, wherein
when the display apparatus is the playback mode, the display control unit is configured to enlarge the 3D image based on a data regarding the detected nearby position of the object near the surface of the touch panel and on a position of the 3D image.

12. The display apparatus according to claim 10, wherein when the display apparatus is in the playback mode, the display control unit is configured to enlarge the 3D image based on data regarding the detected nearby position of the object near the surface of the touch panel and on the position of the 3D image.

13. The display apparatus according to claim 1, further comprising a mode setting unit configured to set the display apparatus to be in a shooting mode or in a playback mode, wherein
depending on whether the display apparatus is set in the shooting mode or in the playback mode, the display control unit is configured to control the display unit based on data regarding the detected nearby position of the object near the surface of the touch panel and on a position of the 3D image.

* * * * *